Oct. 17, 1933.   A. H. OELKERS   1,930,690
ADJUSTING TOOL FOR ROLLER BEARING WHEELS AND AXLE ASSEMBLIES AND THE LIKE
Filed Oct. 17, 1927
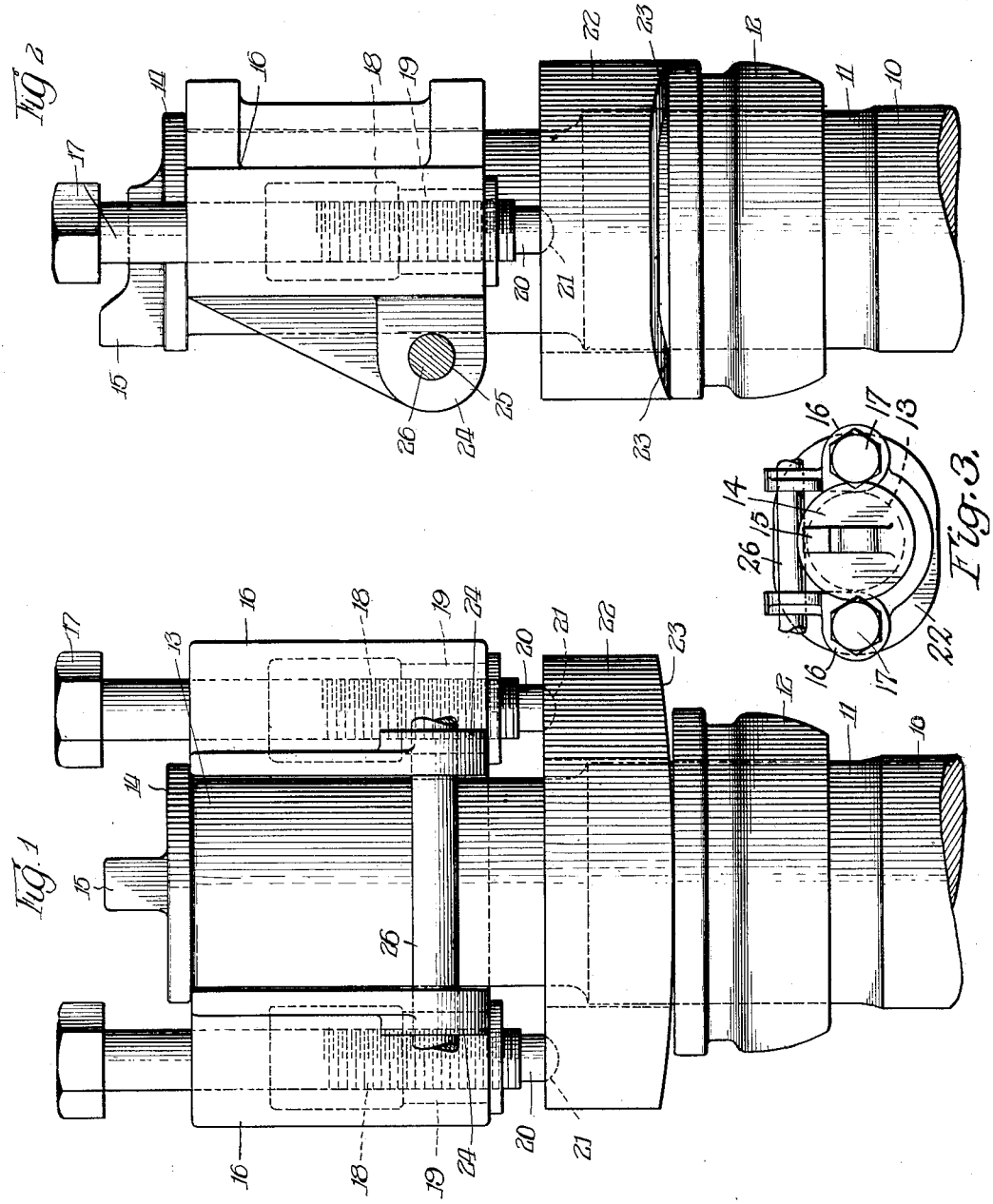
Witness:
P. Burkhardt
Inventor:
Alfred H. Oelkers,
By Wilkinson, Huxley, Byron & Knight
Attys.

Patented Oct. 17, 1933

1,930,690

UNITED STATES PATENT OFFICE 1,930,690

ADJUSTING TOOL FOR ROLLER-BEARING WHEELS AND AXLE ASSEMBLIES AND THE LIKE

Alfred H. Oelkers, Chicago, Ill., assignor to American Steel Foundries, Chicago, Ill., a corporation of New Jersey Application October 17, 1927. Serial No. 226,577

20 Claims. (Cl. 29—85)

This invention pertains to adjusting tools for roller bearing wheel and axle assemblies.

In the form of wheel and axle assemblies illustrated in co-pending applications Serial Nos. 182,734, 184,469, 211,385 and 219,849, it is necessary in assembly to position the inner race ring at a predetermined place before securing the same by means such as a collar pressed or shrunk on the inner axle. Oftentimes in operation, due to the stresses set up in the assemblies and transmitted through the bearings, the bearings loosen or fail, making it necessary to either tighten the same or to remove the same before replacing them, in which case the new bearing must be properly aligned.

It is therefore an object of this invention to provide means for adjusting the races of the bearings of wheel and axle assemblies.

Another object is to provide readily applied and manipulated tools for permitting bearing adjustments of assemblies.

A further object is to provide an inexpensive, simple and sturdy device for adjusting bearings of wheel and axle assemblies and one which fulfills all requirements of manufacture and service.

With these and various other objects in view, the invention may consist of certain novel features of construction and operation as will be more fully described and particularly pointed out in the specification, drawing and claims appended hereto.

In the drawing which illustrates an embodiment of a device and wherein like reference characters are used to designate like parts—

Figure 1 is a fragmentary elevation of one end of a fixed axle, showing the application thereto of a device for inwardly adjusting the bearing cone;

Figure 2 is an elevation taken substantially at right angles to Figure 1, showing the device as applied in Figure 1;

Figure 3 is a view in end elevation of the embodiment shown in Figures 1 and 2 of the drawing.

Referring now more in detail to the drawing, an embodiment selected to disclose the invention is shown as comprising an inner normally fixed axle 10 provided with a cylindrical bearing portion 11 for the reception of a bearing cone or inner race ring 12 of any form of bearing, such as the Timken, self-aligning or any other form adapted to be adjusted on said bearing as by shrinking or a pressed fit. The axle terminates at its end in a cylindrical portion or journal end 13 adapted to be received in any suitable journal boxes, said portion cooperating with the usual wedges and journal brasses, the end of the axle terminating in an annular shoulder 14 either integral or fitted to the axle, the same being provided with a lug 15 for limiting the movement of the fixed axle, all as described in my co-pending applications Serial Nos. 184,469 and 211,385.

The tool for tightening the bearing cone 12 consists essentially of a yoke or U-shaped member 16 adapted to snugly fit the journal end 13 of the axle, which yoke is provided with any number of adjustable elongated members as screws 17, preferably two, diametrically opposed with respect to each other, said screws having threaded portions 18 fitting in a nut or threaded bushing 19 provided in the yoke, the screws then terminating in a preferably hardened tip 20 adapted to cooperate with suitable depressions 21 provided in the adjusting ring 22. Said ring, having a diameter sufficient to properly fit the axle, is disposed between the inner ends of the screw and the race ring cone 12 and is preferably made with rocker shaped cone engaging surfaces 23. The yoke is further provided with upstanding lugs 24 having aligned apertures 25 adapted for the reception of a rod, bolt or roller 26 preferably having a snug fit with the axle after assembly.

After the device has been assembled, having the edge of the yoke engaging with the inner surface of the flange 14 to prevent outward movement of the tool, and it is desired to move the bearing cone inwardly with respect to the axle, it is only necessary that the screws 17 be revolved in a direction to press the cone onto the axle. In this operation, first one screw and then the other is actuated so that the spacer ring 22 is rocked on the faces 23 against the cone 12, gradually moving the cone inwardly of the axle. So it will be seen that with this means a very gradual and exact adjustment of the cone can be made.

It will be seen then that by the tool and method of adjustment described, a very close and fine adjustment of the bearings may be quickly effected, and it is to be understood that I do not wish to be limited by the exact embodiments of the device illustrated, which are merely by way of illustration and not limitation, as other and various forms of the device will of course occur to those skilled in the art.

I claim:

1. In a device of the character described, the combination of an axle engaging yoke including a substantially U-shaped member adapted to embrace the axle, bearing engaging means, and means on said yoke for moving said bearing engaging means.

2. In a device of the character described, the combination of an axle engaging yoke, bearing engaging rocker means, and means on said yoke for moving said rocker means whereby the bearing is moved on said axle.

3. In a device of the character described, the combination of an axle engaging yoke, securing means for preventing release of said yoke from said axle, bearing engaging means, and means on said yoke for moving said bearing engaging means.

4. In a device of the character described, the combination of an axle engaging yoke, securing means permitting motion of said yoke on and preventing release of said yoke from said axle, bearing engaging rocker means, and means on said yoke for moving said rocker means.

5. In a tool for adjusting relatively movable parts of an assembly, the combination of a ring member adapted to embrace a portion of the assembly and having spaced arcuate faces adapted to engage a relatively movable part of the assembly and means for rocking said member on said arcuate faces to thereby impart movement to said relatively movable part.

6. In a tool for adjusting relatively movable parts of an assembly, the combination of a substantially U-shaped member adapted to embrace a relatively fixed part of said assembly and having a member for retaining the same in embracing position, a member adapted to engage a relatively movable part of said assembly, and means carried by one of said members cooperating with the other of said members for moving one of said members to thereby move said relatively movable part.

7. In a tool for adjusting relatively movable parts of an assembly, the combination of a substantially U-shaped member adapted to embrace a relatively fixed part of said assembly and having a member for retaining the same in embracing position, a member adapted to have rocking engagement with a relatively movable part of said assembly, and means carried by one of said members cooperating with the other of said members for rockingly moving said third named member.

8. In a tool for adjusting relatively movable parts of an assembly, the combination of a substantially U-shaped member adapted to embrace a relatively fixed part of said assembly and having a member for retaining the same in embracing position, a member adapted to have rocking engagement with a relatively movable part of said assembly, and independently movable members carried by said first named member cooperating with said third named member for rockingly moving said third named member to thereby move said relatively movable part.

9. A tool for adjusting relatively movable parts of an assembly, comprising a member having arcuate surface portions adapted to engage one of said parts in spaced relation, and means engaging the other of said parts for moving said member to adjust said first-named part.

10. A tool for adjusting relatively movable parts of an assembly, comprising a member having arcuate surface portions adapted to engage one of said parts in spaced relation, and means engaging said member intermediate said surface portions for moving said member to adjust said part.

11. A tool for adjusting relatively movable parts of an assembly, comprising a member having arcuate surface portions adapted to engage one of said parts in spaced relation, and means engaging said member in spaced relation and intermediate said surface portions for moving said member to adjust said part.

12. A tool for adjusting relatively movable parts of an assembly, comprising a member fitting over one of said parts and having spaced arcuate surface portions engaging with the other of said parts, and means for moving said member, said means including a member engaging said first-named part, and a movable member carried by said last-named part engaging member and engageable with said first-named part engaging member whereby adjustment of said first-named part is effected.

13. A tool for adjusting relatively movable parts of an assembly, comprising a member fitting over one of said parts and having spaced arcuate surface portions engaging with the other of said parts, and means for moving said member, said means including a member engaging said first-named part, and spaced movable members carried by said last-named part engaging member and adapted to engage said first-named part engaging member in spaced relation, said spaced members being adapted to be moved simultaneously or alternately for effecting an adjustment of said first-named part.

14. A tool for adjusting relatively movable parts of an assembly, comprising a member fitting over one of said parts and having spaced arcuate surface portions engaging with the other of said parts, means for moving said member, said means including a member engaging said first-named part, and spaced movable members carried by said last-named part engaging member and adapted to engage said first-named part engaging member in spaced relation and intermediate of said surface portions, said spaced members being adapted to be moved simultaneously or alternately for effecting an adjustment of said first-named part.

15. A tool for adjusting relatively movable parts of an assembly, comprising a member formed with spaced arcuate surfaces engaging with one of said parts, a second member engaging with the other part, and movable members carried by said second member and having a free end engaging said first-named member, said movable members being adapted to be moved simultaneously or alternately to effect an adjustment of said parts.

16. A tool for adjusting relatively movable parts of an assembly, comprising a member formed with spaced arcuate surfaces engaging with one of said parts, a second member engaging with the other part, and movable members carried by said second member and having a free end engaging said first-named member in spaced relation and intermediate said arcuate surface portions, said movable members being adapted to be moved simultaneously or alternately to effect an adjustment of said parts.

17. A tool for adjusting relatively movable parts of an assembly, comprising means provided with arcuate surface portions adapted to engage one of said parts in spaced relation, and means for applying forces substantially in a plane parallel to and between said arcuate surfaces to said first-named means to move the same to adjust said part whereby said part is free from binding upon movement thereof on the other of said parts.

18. A tool for adjusting relatively movable parts of an assembly, comprising means provided with spaced and substantially parallel arcuate surface portions adapted to engage one of said parts, and means engaging the other of said parts in spaced relation between said arcuate surfaces for applying forces to said first-named means to move the same and to adjust said part whereby said part is free from binding upon movement thereof on the other of said parts.

19. A tool for adjusting relatively movable parts of an assembly, comprising means adapted to fit over one of said parts and having arcuate surface portions engaging with the other of said parts, and means for moving said first-named means whereby said last-named part is adjustably positioned on said first-named part, said last-named means being adapted to apply forces to said first-named means in spaced relation and between said arcuate surfaces to prevent binding of said last-named part on said first-named part.

20. A tool for adjusting relatively movable parts of an assembly, comprising means provided with arcuate surface portions engaging with one of said parts, and means engaging the other of said parts for moving said first-named parts to adjustably position the same on said last-named part, said last-named means being adapted to apply forces to said first-named means substantially in a plane parallel to and between said arcuate surfaces to prevent binding of said parts.

ALFRED H. OELKERS.